Inventors:
John Kenneth Bache
Horace Aston

United States Patent Office 3,326,545
Patented June 20, 1967

3,326,545
COMPENSATOR DEVICES FOR IMPROVING THE EXTENSION CHARACTERISTICS OF COIL EXTENSION SPRINGS
John K. Bache and Horace Aston, West Bromwich, England, assignors to George Salter and Company Limited, West Bromwich, England, a British company
Filed July 12, 1965, Ser. No. 471,359
Claims priority, application Great Britain, July 15, 1964, 29,243/64
6 Claims. (Cl. 267—61)

This invention is concerned with a compensator device for improving the extension characteristics of helical coil extension springs, and it is especially applicable to such springs which are used as the load-balancing elements in spring weighing machines.

It is well known that a helical coil extension spring as normally used for weighing machines does not possess a strictly linear response to load, but stiffens slightly as the pitch angle of the coil turns increases during extension. Although the degree of this increase in stiffening is usually small and is frequently quite acceptable for many weighing applications, in some cases greater precision in the linear extension characteristics is required and a solution to this problem introduced by the increase in stiffening occurring with change of pitch angle during extension must be sought.

The present invention seeks to overcome this problem by providing a compensator device, the action of which is based on the concept of introducing, artificially, into the initially unextended spring, a certain degree of extra stiffening which is arranged to decrease progressively as the spring is extended, thereby to counteract the increase in the natural stiffening of the spring which takes place simultaneously due to the increase in pitch angle of the coil turns.

Thus, according to the present invention, a compensating device for improving the extension characteristics of a helical coil extension spring consists of a member which is adapted to be fitted to the spring with part thereof engaging and fitting between adjacent coil turns so that a predetermined degree of extra stiffening is introduced artificially into the unextended spring by reduction of its effective length as a result of localised deformation of said coil turns, said coil-engaging part of the device having a varying thickness and profile of such form that the length of the coil turns in engagement therewith decreases progressively as the spring is extended under load so that the degree of extra stiffening introduced thereby also decreases progressively and compensates for the progressive increase in the natural stiffening of the spring which occurs during extension as a result of the progressive increase in pitch angle of the coil turns.

In a preferred embodiment, the aforesaid coil-engaging part of the device is in the form of a rigid helical rib, conveniently of rectangular section, which engages the coil turns along its side faces, the thickness of said rib over at least a portion adjacent one end being progressively diminished in accordance with a progressive decrease over said end portion in the pitch angle of the rib side face which is presented outwardly along the helical axis at said end whereby the length of the coil turns of the spring which engages said outwardly-presented side face of the rib is reduced progressively as the spring is extended under load. The outwardly-presented side face at each end of the helical rib may have a similar progressive reduction in pitch angle which ranges from a value, at the extreme ends of the rib, which is substantially equal to the normal pitch angle of the coil turns of the unextended spring to a value, over the middle portion of the rib intermediate the ends, which is substantially equal to the pitch angle of the coil turns of the fully extended coil spring.

The helical rib itself may be less than one complete helical turn, extending through an angle of less than 360°, but preferably it extends through an angle greater than 180°, and it may be carried by, and formed integral with, a cylindrical central body part or carrier which fits closely within the coil of the spring.

By way of example, one convenient embodiment of the invention is illustrated in the accompanying drawings, in which.

Figure 1:
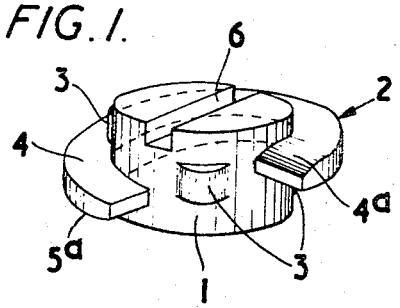
FIGURE 1 is a perspective view of the compensator device.
Figure 2:
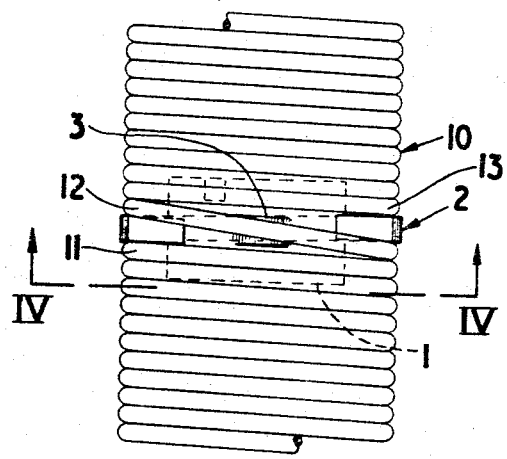
FIGURE 2 is a side elevational view showing the device fitted in position in a helical coil extension spring.
Figure 3:
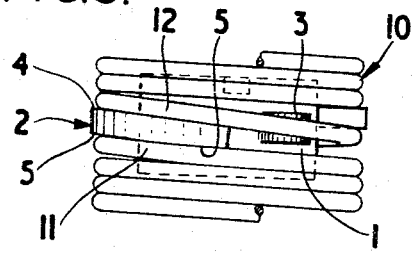
FIGURE 3 is a view similar to FIGURE 2 but showing the device from a slightly different aspect.

Referring to the drawings, the compensator device illustrated therein is designed for improving the extension characteristics of a particular size of helical coil extension spring which is indicated by the reference 10 in FIGURES 2 and 3. The device comprises a short cylindrical central body part 1 having an integrally-formed rigid helical rib 2 extending around its exterior surface.

Figure 4:
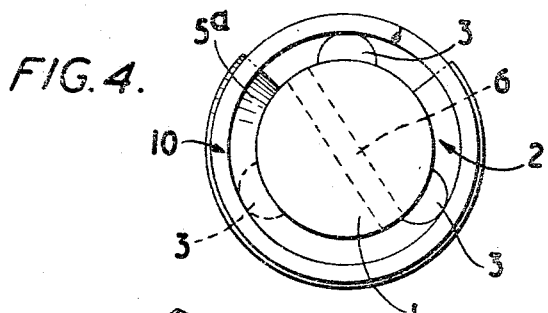
FIGURE 4 is a cross-sectional view through the spring on line IV—IV of FIGURE 2.

This rib 2, which has a rectangular cross-section does not form a complete helical turn but conveniently extends through an angle between 180° and 360°, and as indicated particularly in FIGURES 2, 3 and 4, it is adapted to be inserted between adjacent turns 11, 12 and 13 of the coil spring 10 with its upper and lower side faces, 4 and 5 respectively, in engagement therewith, the cylidnrical body part 1 being accommodated within the coil of the spring 10. Three protrusions 3 on the surface of the body part 1 fit closely on the inside diameter of the spring 10 and serve to locate the device centrally.

The device is introduced into the coil spring by screwing it along from one end and to facilitate this action, a screw-driver slot 6 is conveniently provided at one end of the body part 1.

In accordance with the invention, over the middle portion of the length of the helical rib 2, the side faces 4 and 5 have a uniform pitch angle which is greater than the normal pitch angle of the coil turns of the spring 10 in its unextended condition and which, in this instance, is substantially equal to the pitch angle of the coil turns of the spring in its fully extended position. Towards the upper end of the helical rib 2, however, the upper side face 4, which is the side face presented outwardly along the helix axis at this end, has a pitch angle which progressively decreases over the end region 4a, and terminates with a pitch angle which is substantially equal to that of the coil turns of the spring in its unextended condition.

Similarly, the pitch angle of the lower side face 5 is progressively reduced over the end region 5a at the lower end of the helical rib which has a profile identical with that of the region 4a at the upper end.

Figure 5:
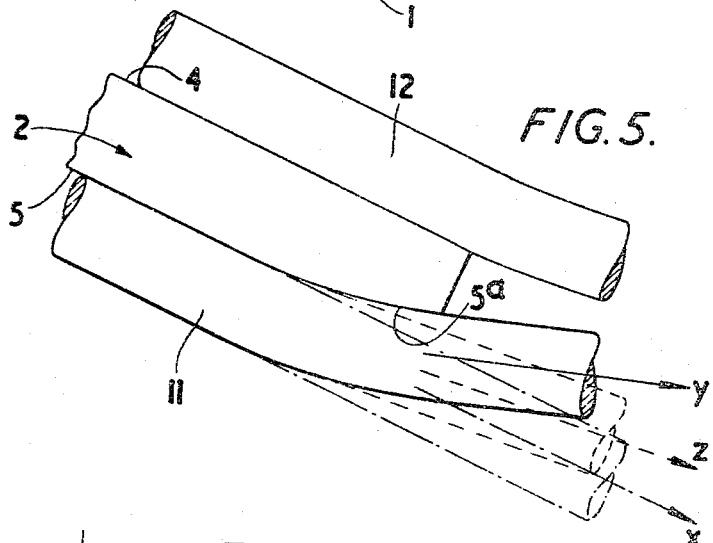
FIGURE 5 is a diagrammatic view, on a larger scale, showing the engagement of a portion of the device with a part of the coil spring under different degrees of loading.

This variation in pitch angle is illustrated more clearly in FIGURE 5 which is a diagrammatic view on a larger scale of the lower end of the helical rib 2, shown in FIGURE 3, in engagement with adjacent turns 11 and 12 of the coil spring 10, the angles shown being much exaggerated for the sake of clarity. In this FIGURE 5, line $x$ represents the pitch angle of the side faces 4 and 5 over the middle portion of the helical rib 2 intermediate the ends and also, the pitch angle of the turns of the fully extended spring. Line $y$ represents the pitch angle at the extreme lower end of the lower side face 5, and also the normal pitch angle of the coil turns of the unextended spring. Line $z$ represents the normal pitch angle of the coil turns of the spring in a partially extended condition.

When the compensator device is fitted into the unextended spring, the portions of the coil turns of the latter which are in engagement with the faces 4 and 5 of the rib 2 are locally deformed and rendered inactive since the helix angle tends to conform to that of the rib, so that the effective length of the spring is reduced and a certain degree of extra stiffening is artificially introduced.

When the spring is extended under load, however, the natural helical angle of the coil turns increases and the length of the turns in engagement with the helical rib 2 decreases over the end regions 4a and 5a of the upper and lower side faces, as will be clear from consideration of FIGURE 5 so that the length of the inactive portion and the extra stiffening artificially introduced is reduced. Thus, the increase in natural stiffening which occurs with increase in the natural pitch angle of the coil turns is counteracted, and by a proper choice of dimensions more or less complete compensation can be achieved so that the spring has a strictly linear load/extension response.

To arrive at the optimum design of the compensator device for a given spring, the deviation from the desired linear extension characteristic may first be measured for the uncompensated spring at a series of points on the load/extension characteristic curve. At each point, the extent by which the effective length of the spring would have to be altered in order to remove the deviation error can then be calculated, and together with knowledge of the natural pitch angle of the coil turns for the extension at each point, the approximate contour necessary for the end regions 4a and 5a of the rib 2 can then be found on the basis of the change in effective length which is required at each stage. Working between the limits which have been mentioned previously for the variation in pitch angle of the side faces of the helical rib 2, assuming tangential contact of the coil turns wth the latter, and with knowledge of the circumferential length of the coil turns, an uncoiled two-dimensional profile of the rib can then be drawn which will incidentally determine the thickness of the rib. Although the actual length of the helical rib is to some extent an arbitrary quantity, in general it should extend through an angle greater than 180° so as to reduce any tendency for distortion of the longitudinal axis of the spring, but excessive length should be avoided in order to avoid an unnecessarily large reduction in the effective length of the spring over the whole of its working range and preferably, the rib will extend through an angle less than 360°.

Having made up a sample compensator device with a profile designed as indicated above, experimental tests may then be carried out which may suggest desirable slight modifications to the calculated contour in order to achieve a higher degree of compensation over the working range of the spring, and after carrying out such modifications empirically, the sample may be used as a pattern for production in quantity, as by die-casting for example, of compensator devices for use with similar springs.

Figure 6:
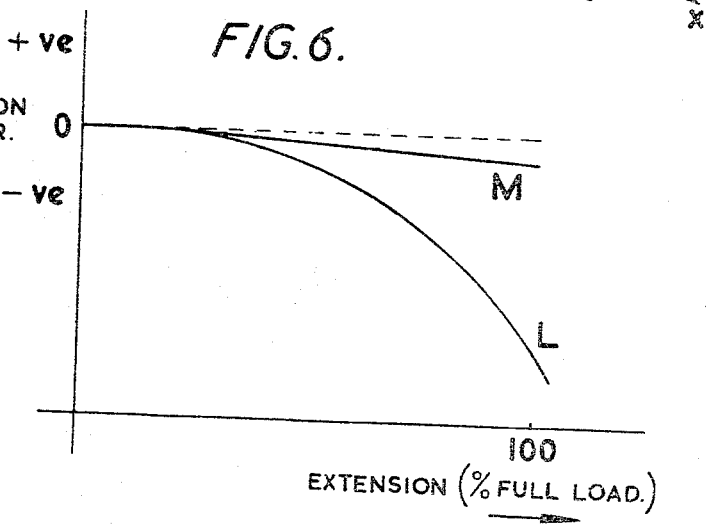
FIGURE 6 is an explanatory graph.

By way of illustration, the graph of FIGURE 6 shows the general form of typical characteristic curves for an uncompensated spring (curve L) and for a spring fitted with a compensator device in accordance with the present invention (curve M), the deviation error in extensions from the theoretical linear extension/load characteristic curve being plotted against the percentage full load extension. Although curve M does not show the achievement of complete compensation in the sense that the deviation error is completely eliminated over the whole working range, the value of the deviation error is kept relatively small and its rate of change is virtually constant so that its performance represents a major improvement over the performance of the uncompensated spring.

If desired, more than one of these compensator devices may be fitted at different positions along the length of a given coil spring, and also, the compensator device may be designed with a discontinuous rib or series of coil-engaging projections giving the required overall contour necessary to provide a compensation effect.

We claim:

1. A compensator device for improving the extension characteristics of a helical coil extension spring, said device consisting of a member having a part which lies along a helical path and which engages and fits between adjacent coil turns of the spring to be compensated, with localised deformation of the latter, whereby a predetermined degree of extra stiffening is introduced artificially into the unextended spring by reduction in its effective length, the thickness of said coil-engaging part diminishing towards at least one end, providing a profile of such form that the length of the coil turns in engagement therewith decreases progressively as the spring is extended under load whereby the degree of extra stiffening introduced also decreases progressively and compensates for the progressive increase in natural stiffening of the spring which is caused by the progressive increase in pitch angle of the coil turns during extension.

2. A compensator device for improving the extension characteristics of a helical coil extension spring according to claim 1, wherein said coil-engaging part has upper and lower coil-engaging surfaces which each have a helical contour and vary in pitch angle from a value, at their outer ends, which is substantially equal to the normal pitch angle of the coil turns of the unextended spring to a value, over a region remote from their outer ends, which is substantially equal to the pitch angle of the coil turns of the fully extended spring.

3. A compensator device for fitting to a helical coil spring to improve the extension characteristics thereof, said device comprising a body part and carried by said body part, a helical rib which is insertable between adjacent coil turns of the spring, and which has upper and lower helical side faces which engage and locally deform said adjacent coil turns whereby a predetermined degree of extra stiffening is introduced artificially into the unextended spring by reduction of its effective length, the pitch angle of one of said side faces over at least one end portion of the helical rib varying within the range of natural pitch angles assumed by the coil turns of the spring throughout its working range and becoming progressively smaller towards the adjacent end of the rib whereby the rib presents a coil-engaging profile of such form that the length of the coil turns in engagement therewith decreases progressively as the spring is extended under load whereby the degree of extra stiffening introduced also decreases progressively and compensates for the progressive increase in natural stiffening of the spring which is caused by the progressive increase in pitch angle of the coil turns during extension.

4. A compensator device according to claim 3 in which the helical rib has a rectangular cross-section and is symmetrical in form about its mid-point, the upper side face at the upper end having a profile similar to that of the lower side face at the lower end, and each having a pitch angle which ranges from a value which is substantially equal to the normal pitch angle of the coil turns of the unextended spring to a value which is substantially equal to the normal pitch angle of the coil turns of the fully extended spring.

5. A compensator device according to claim 3 in which the helical rib extends through an angle which is greater than 180° and less than 360°.

6. A compensator device according to claim 3 in which the body part comprises a cylindrical carrier which fits closely within the coil of the spring and which is integrally formed with the helical rib.

No references cited.

ARTHUR L. LA POINT, *Primary Examiner.*

R. M. WOHLFARTH, *Assistant Examiner.*